US011436263B2

(12) United States Patent
Karia (10) Patent No.: US 11,436,263 B2
(45) Date of Patent: Sep. 6, 2022

(54) GEOCODING METHODS AND SYSTEMS OF CORRECTING LATITUDE AND LONGITUDE OF A POINT OF INTEREST

(71) Applicant: Palash Karia, Indore (IN)

(72) Inventor: Palash Karia, Indore (IN)

( * ) Notice: Subject to any disclaimer, the term of this patent is extended or adjusted under 35 U.S.C. 154(b) by 0 days.

(21) Appl. No.: 16/839,052

(22) Filed: Apr. 2, 2020

(65) Prior Publication Data

US 2021/0311971 A1 Oct. 7, 2021

(51) Int. Cl.
| | | |
|---|---|---|
| *G06F 16/29* | (2019.01) | |
| *G06F 3/0486* | (2013.01) | |
| *H04W 4/024* | (2018.01) | |
| *H04W 4/021* | (2018.01) | |
| *G06F 3/0488* | (2022.01) | |

(52) U.S. Cl.
CPC ............ *G06F 16/29* (2019.01); *G06F 3/0486* (2013.01); *G06F 3/0488* (2013.01); *H04W 4/021* (2013.01); *H04W 4/024* (2018.02)

(58) Field of Classification Search
CPC ........ G06F 16/29; G06F 3/048; G06F 3/0486; G06F 3/0488–04886; H04W 4/02–029; H04W 4/021–022; H04W 4/024; G06Q 10/083–0838
See application file for complete search history.

(56) References Cited

U.S. PATENT DOCUMENTS

| | | | | |
|---|---|---|---|---|
| 8,463,774 | B1 * | 6/2013 | Buron ..................... | G06F 16/95 707/724 |
| 9,743,239 | B1 * | 8/2017 | Mishra ................. | H04W 4/023 |
| 2007/0150186 | A1 * | 6/2007 | Ingulsrud ........... | G01C 21/3856 701/431 |
| 2008/0010273 | A1 * | 1/2008 | Frank ................... | G06F 16/9537 |
| 2008/0056538 | A1 * | 3/2008 | Frank .................... | G06F 16/338 382/113 |
| 2011/0112762 | A1 * | 5/2011 | Gruijters ................ | G01C 21/36 701/532 |
| 2013/0073976 | A1 * | 3/2013 | McDonald ............ | G06F 16/447 715/739 |
| 2013/0326407 | A1 * | 12/2013 | van Os ................. | G06F 3/0482 715/810 |
| 2014/0278691 | A1 * | 9/2014 | Schenken .............. | G06Q 50/28 705/7.22 |
| 2015/0006429 | A1 * | 1/2015 | Staples ................ | G06Q 10/083 705/337 |
| 2021/0103447 | A1 * | 4/2021 | Wei ................... | H04M 1/72472 |

* cited by examiner

*Primary Examiner* — Liang Y Li (57) ABSTRACT

In one aspect, a computerized method for automatically implementing geocoding corrections in a routing system includes the step of providing a user-side mobile device, wherein the user-side mobile device comprises a routing application and display a web map. The method includes the step of geocoding a correction to the latitude and longitude of a point of interest. The method includes the step of enabling an end-user of the user-side mobile device to enters an address string into the routing application. The method includes the step of geocoding the address string to a best possible location. The method includes the step of generating a confidence score for the geocoded location. The method includes the step of providing the display of the web map with a set of draggable location markers on the web map with a confidence-sorted list on the side of the display. The method includes the step of posting a correctly geocoded location with a routing service using the routing application.

2 Claims, 6 Drawing Sheets

GEOCODING METHODS AND SYSTEMS OF CORRECTING LATITUDE AND LONGITUDE OF A POINT OF INTEREST

BACKGROUND

In any routing problem, one of the major points of data corruption is the method by which you know where a given address is. This conversion of address to a latitude and longitude depends on a few factors, such as, inter alia: goodness of the input (e.g. 'the address string'); intelligence of the 'geocoding' logic and the amount of data available to it; confidence of the conversion; input=the address string; geocoding equals converting an address to latitude/longitude; confidence=Confidence of the correctness of a guessed location (e.g. low (red), medium (orange) and high (blue), etc.); location equals 'latitude/longitude pair'; etc.

It is noted that any conversion of an address depends on the goodness of the input, and the amount of relevant data available. Sometimes the goodness of an address can vary from 'XYZ building, ABC Road, City'(1) to 'Reach XYZ Building, walk to the 4th shop in the third lane to the left'(2). While in the cases of good addresses(1), process are able to determine the location with certain accuracy. In the latter cases, current processes are unable to determine the location accurately enough even after using intelligence, and large amounts of information. The best that one is able to do is point to a general area and leave it there. This is the point at which improvements to the current art are needed.

It is further noted that, since the demand is dynamic, orders may be added and canceled at any time prior to loading the vehicle. However, the routing engine uses data of all orders to be able to optimize efficiently. CVRP can be a difficult to solve, routing engines typically require several minutes to solve it. This means that the system cannot accept orders x minutes before dispatch time, where x is the time that plan generation takes.

In case a delivery plan is generated and vehicles have started being loaded and additional orders come in, resulting in the dispatcher having to run another plan including the new orders, the loaded vehicles need to be unloaded first and items re-distributed as the routing engine would give a completely new optimal solution.

BRIEF SUMMARY OF THE INVENTION

In one aspect, a computerized method for automatically implementing geocoding corrections in a routing system includes the step of providing a user-side mobile device, wherein the user-side mobile device comprises a routing application and display a web map. The method includes the step of geocoding a correction to the latitude and longitude of a point of interest. The method includes the step of enabling an end-user of the user-side mobile device to enters an address string into the routing application. The method includes the step of geocoding the address string to a best possible location. The method includes the step of generating a confidence score for the geocoded location. The method includes the step of providing the display of the web map with a set of draggable location markers on the web map with a confidence-sorted list on the side of the display. The method includes the step of posting a correctly geocoded location with a routing service using the routing application.

BRIEF DESCRIPTION OF THE DRAWINGS

The Figures described above are a representative set and are not an exhaustive with respect to embodying the invention.

DESCRIPTION

Disclosed are a system, method, and article of geocoding corrections to the latitude and longitude of a point of interest. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment, according to some embodiments. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) can specify how software components of various systems interact with each other.

Cloud computing can involve deploying groups of remote servers and/or software networks that allow centralized data storage and online access to computer services or resources. These groups of remote serves and/or software networks can be a collection of remote computing services.

Drag and drop is a pointing device gesture in which the user selects a virtual object by grabbing it and dragging it to a different location or onto another virtual object. It can be used to invoke many kinds of actions and/or create various types of associations between two abstract objects such as a location and a geocode.

Geocode is a code that represents a geographic entity (location or object). It is a unique identifier of the entity, to distinguish it from others in a finite set of geographic entities. The geocode can be a human-readable and short identifier.

Geocoding is the process of taking input text, such as an address or the name of a place, and returning a latitude/longitude location on the Earth's surface for that place. It is noted that reverse geocoding converts geographic coordinates to a description of a location, usually the name of a place or an addressable location. Geocoding can utilize on a computer representation of address points, the street/road network, together with postal and administrative boundaries.

Global Positioning System (GPS) is a satellite-based radio navigation system owned by the United States government and operated by the United States Space Force.

Latitude is a geographic coordinate that specifies the north-south position of a point on the Earth's surface. Latitude is an angle which ranges from 0° at the Equator to 90° (North or South) at the poles.

Longitude is a geographic coordinate that specifies the east-west position of a point on the Earth's surface. Longitude is an angular measurement (e.g. expressed in degrees). A longitude pair (lating) can be a pair of latitude and longitude coordinates.

Point of interest (POI) can be a specific point location (e.g. in a urban area as indicated on a web map) that someone may find useful or interesting.

Routing is the process of selecting a path for traffic.

Web mapping is the process of using the maps delivered by geographic information systems (GIS) in World Wide Web. A web map on the World Wide Web can be served, consumed and/or updated. Web GIS emphasizes geodata processing aspects more involved with design aspects such as data acquisition from various sources, including manual updates from users (e.g. via a drag and drop operation).

Example Systems

Figure 1:
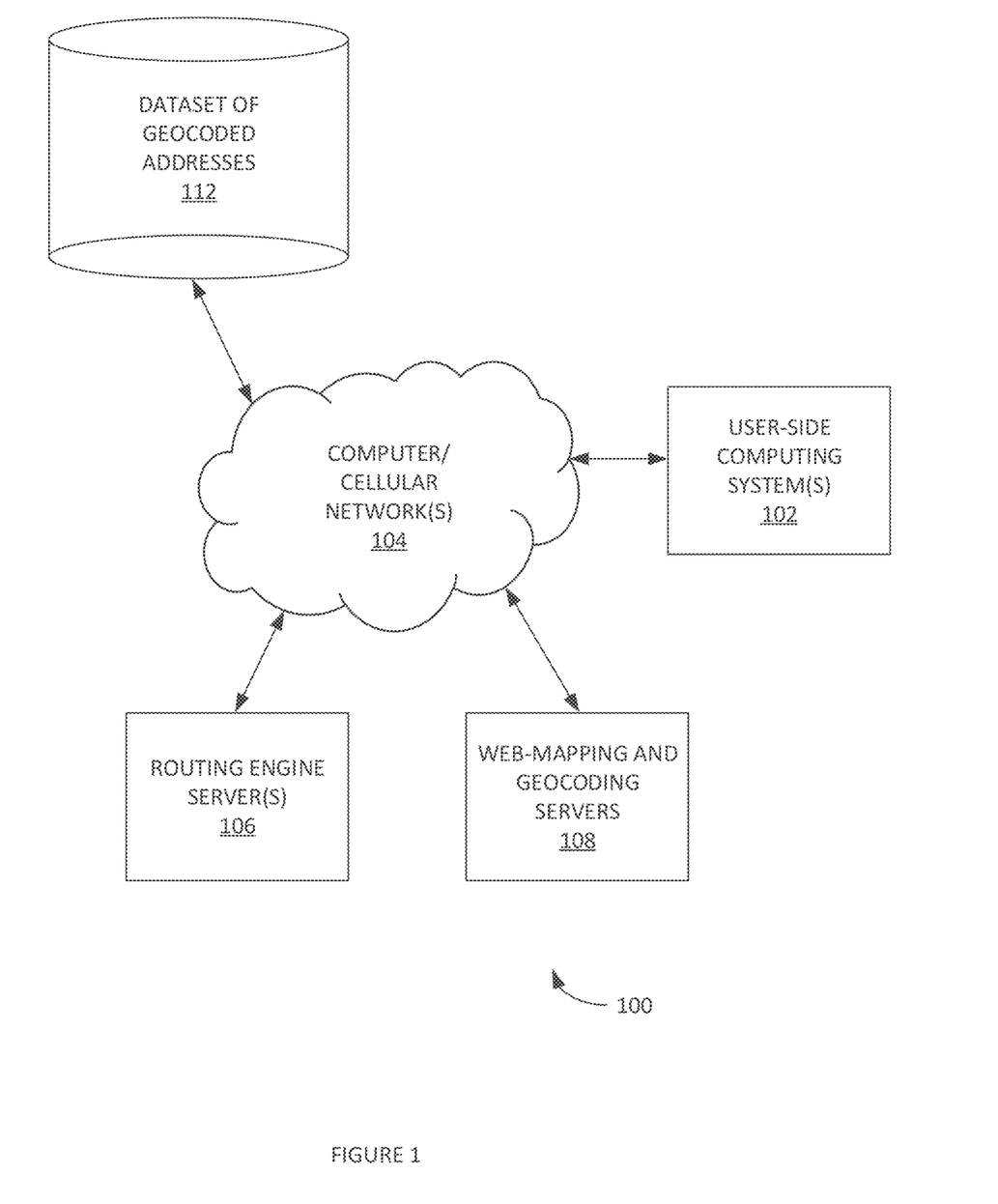
FIG. 1 illustrates an example system for implementing geocoding corrections in a routing system, according to some embodiments.

FIG. 1 illustrates an example system 100 for implementing geocoding corrections in a routing system, according to some embodiments. System 100 can provide an interactive map design. The interactive map design can allow edits on a mapping service (e.g. a web map) by dragging markers. System 100 can enable user edits for multiple markers present on the same location by using a set of clustering and dragging operations.

System 100 can provide various location confidence classifications as well. In one example, confidence classifications can be based on a statistical confidence interval (CI). The CI is a type of estimate computed from the statistics of the observed data. This proposes a range of plausible values for an unknown parameter (for example, the mean). The interval has an associated confidence level that the true parameter is in the proposed range.

Figure 3:
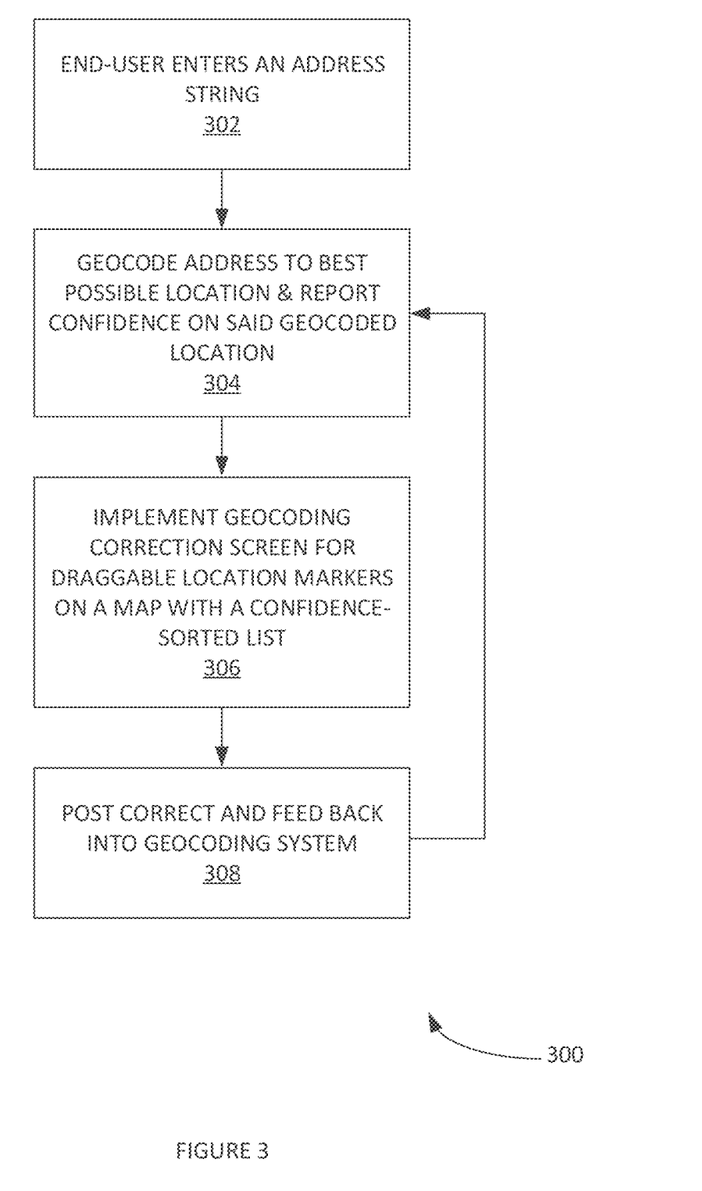
FIG. 3 illustrates an example process for geocoding corrections to the latitude and longitude of a point of interest, according to some embodiments.
Figure 4:
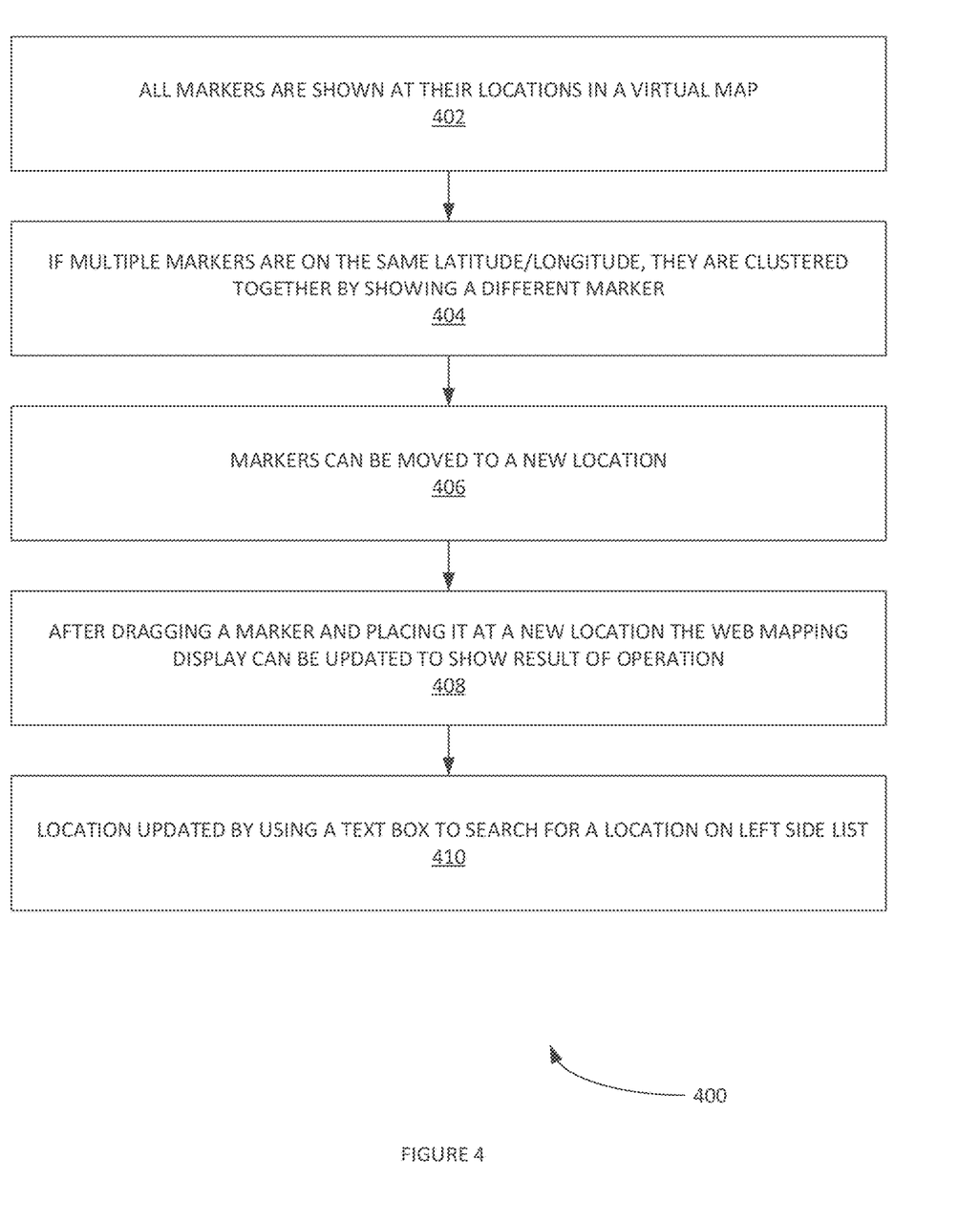
FIG. 4 illustrates an example process for correcting a POI geocode with a web mapping application, according to some embodiments.

In one example, a supply chain optimization entity can use routing system 100. Routing system 100 can include a routing engine server(s) 106. Routing engine server(s) 106 can include one or more routing engines. A routing engines can create a delivery plan of those orders distributed into vehicles. Routing engines can use process 300 and 400 to optimize the delivery plan. For example, processes 300 and 400 can be used to update incorrectly geocoded POIs and ensure greater geocoding accuracy for delivery routes.

Routing system 100 can include user-side computing system(s) 102. User-side computing system(s) 102 can include various geo-location applications, navigation applications and/or mapping applications. Routing information can be communicated to these application. For example, navigation application can use an Internet connection to a GPS navigation system to provide turn-by-turn voice-guided instructions on how to arrive at a given destination. The navigation application can use a connection to Internet data (e.g. 3G, 4G, WiFi, etc.) and use a GPS satellite connection to determine the user-side computing system(s) 102. Local addresses, regions and/or POI (point of interest) can be identified and updates (e.g. using processes 300 and 400, etc.). A user can enter a destination into the navigation application. The navigation application can plot a path to it. The navigation application can display the user's progress along the route and issues instructions for each turn.

User-side computing system(s) 102 can be mobile device (s), laptops, etc. that includes an automated salesbeat optimization application (e.g. a sales-fleet management application). User-side computing system(s) 102 can communicate delivery and/or load allocation information to Routing engine server(s) 106.

Computer/Cellular networks 104 can include the Internet, text messaging networks (e.g. short messaging service (SMS) networks, multimedia messaging service (MMS) networks, proprietary messaging networks, instant messaging service networks, email systems, etc. Computer/Cellular networks 104 can include cellular networks, satellite networks, etc. Computer/Cellular networks 104 can be used to communicate messages and/or other information (e.g. videos, tests, articles, digital images, videos etc.) from the various entities of routing system 100.

Routing engine server(s) 106 can include various other functionalities such as, inter alia: web servers, SMS servers, IM servers, chat bots, database system managers, e-commerce engines, geo-mapping functionalities, web mapping services, etc. Routing engine server(s) 106 can include manage a mobile-device application in both user-side computing device(s) 102.

Routing engine server(s) 106 can manage an API service which clients may communicate with via RESTful HTTP APIs. These APIs enable a client to pass input data like details of batch of orders to be fulfilled, vehicle information and configurations. This API system stores the details and invokes the route optimization engine to come up with a delivery plan. Routing engine server(s) 106 can accept additional orders on the same batch of orders once the delivery plan is generated. The routing engine can build an incremental solution using an existing delivery plan and newer orders added to the existing batch of orders. The API service can accept newer orders on the same batch of tasks. The routing engine can create an incremental plan based on an existing delivery plan and additional orders.

Routing engine server(s) 106 can manage messages about the batch of orders and existing delivery plan. Data can be stored and read from a common database. Messages containing metadata are passed using queues, and the systems fetch the required data from the database by querying using the metadata from the message.

Web-mapping and geocoding servers 108 can interface with routing engine server(s) 106. Web-mapping and geocoding servers 108 can provide web mapping and/or geocoding functionalities. For example, a routing application used by routing engine server(s) 106 to route delivers can also serve a web map with geocoded locations. Drivers (and/or other end users) can modify the geocoding of the web maps to identify incorrect locations and provide suggested correct locations. In one example, web-mapping and geocoding servers 108 can be used to correct latitude and longitude for a given address using manual input to augment the system's intelligence with local geographical knowledge. This can be implemented with a drag and drop operation on the mobile device touch screen and/or other interface.

Web-mapping and geocoding servers 108 can include a geocoder tool. Geocoder tool can be a piece of software or a web service that implements a geocoding process. For example, a set of interrelated components in the form of operations, algorithms, and data sources that work together to produce a spatial representation for descriptive locational references. Geocoder tool can obtain geo-code various POIs and/or update a dataset of previously geo-coded POIs. System 100 can include dataset of geocoded POIs and regions 112. Web-mapping and geocoding servers 108 can be used to update geocoded POIs and regions 112 based on the user input indicating and updated location for a previously incorrectly geocode POI.

As shown, routing engine server(s) 106 and web-mapping and geocoding servers 108 can interact with any client systems (e.g. dispatcher(s) computing device(s) 102, etc.). Clients can automatically or manually load vehicles according to the delivery plan generated by the routing engine mentioned. In this way, routing system 100 can simplify operations as vehicles do not have to be reloaded completely on every optimization run. Web-mapping and geocoding servers 108 can.

Routing engine server(s) 106 and web-mapping and geocoding servers 108 can utilize machine learning techniques (e.g. artificial neural networks, etc.). Machine learning techniques can be used to improve confidence classifications and/or other automated aspects provided herein. Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning.

Figure 2:
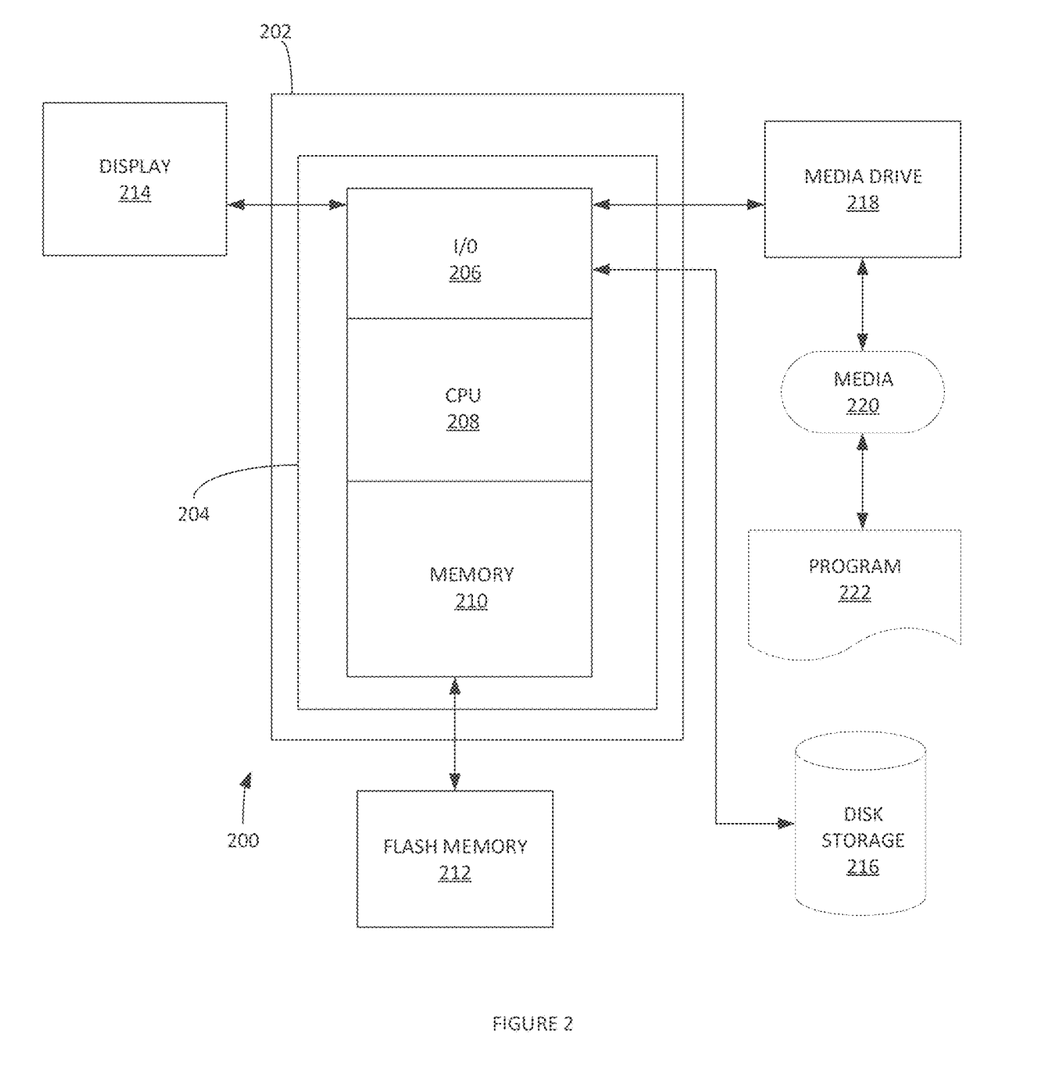
FIG. 2 is a block diagram of a sample computing environment that can be utilized to implement various embodiments.

FIG. 2 depicts an exemplary computing system 200 that can be configured to perform any one of the processes provided herein. In this context, computing system 200 may include, for example, a processor, memory, storage, and I/O devices (e.g., monitor, keyboard, disk drive, Internet connection, etc.). However, computing system 200 may include circuitry or other specialized hardware for carrying out some or all aspects of the processes. In some operational settings, computing system 200 may be configured as a system that includes one or more units, each of which is configured to carry out some aspects of the processes either in software, hardware, or some combination thereof.

FIG. 2 depicts computing system 200 with a number of components that may be used to perform any of the processes described herein. The main system 202 includes a motherboard 204 having an I/O section 206, one or more central processing units (CPU) 208, and a memory section 210, which may have a flash memory card 212 related to it. The I/O section 206 can be connected to a display 214, a keyboard and/or other user input (not shown), a disk storage unit 216, and a media drive unit 218. The media drive unit 218 can read/write a computer-readable medium 220, which can contain programs 222 and/or data. Computing system 200 can include a web browser. Moreover, it is noted that computing system 200 can be configured to include additional systems in order to fulfill various functionalities. Computing system 200 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Example Methods

FIG. 3 illustrates an example process 300 for geocoding corrections to the latitude and longitude of a point of interest, according to some embodiments. Beyond the layer of geocoding intelligence, process 300 can aid in location data correction, by augmenting the system's intelligence with the local knowledge available to the humans using it. Process 300 focuses on the interactions related to the same, which is called the 'geocode correction tooling'. In step 302, process 300 can enable end-user enters an address string. In step 304, process 300 can geocode the address to the best possible location and report confidence on said geocoded location. In step 306, process 300 can provide a screen for draggable location markers on a map with a confidence-sorted list on the side. This can be a webpage, application web map, etc. In step 308, process 300 can post a correctly geocoded location. Process 300 can also feed the correctly geocode location into geocoding system. For example, process 300 can update the lating of POI in dataset of geocoded POIs and regions 112.

Figure 5:
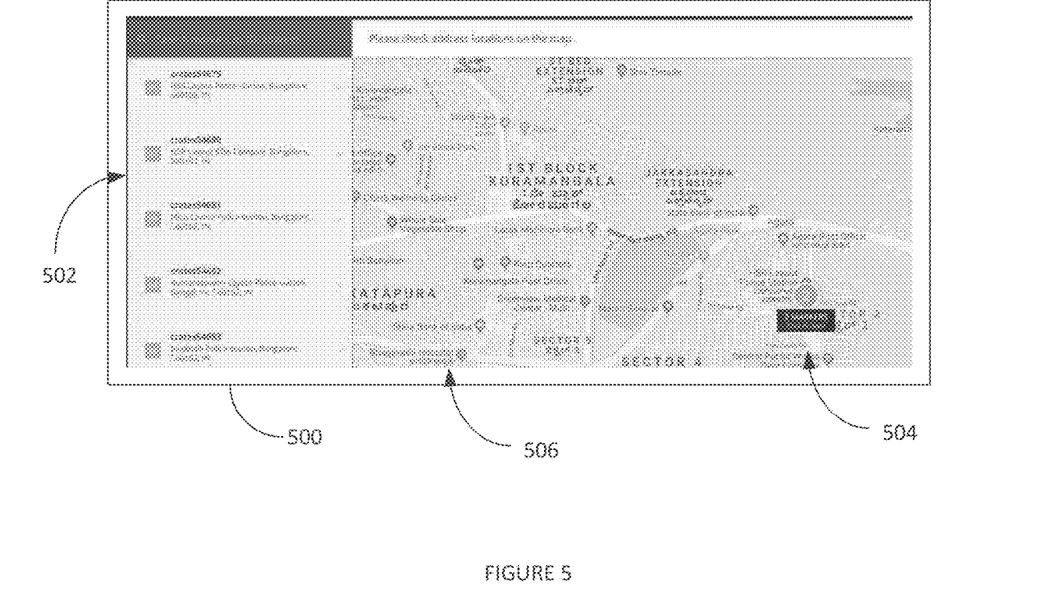
FIG. 5 illustrates an example process for dragging a marker and placing it at a new location a web mapping display, according to some embodiments.
Figure 6:
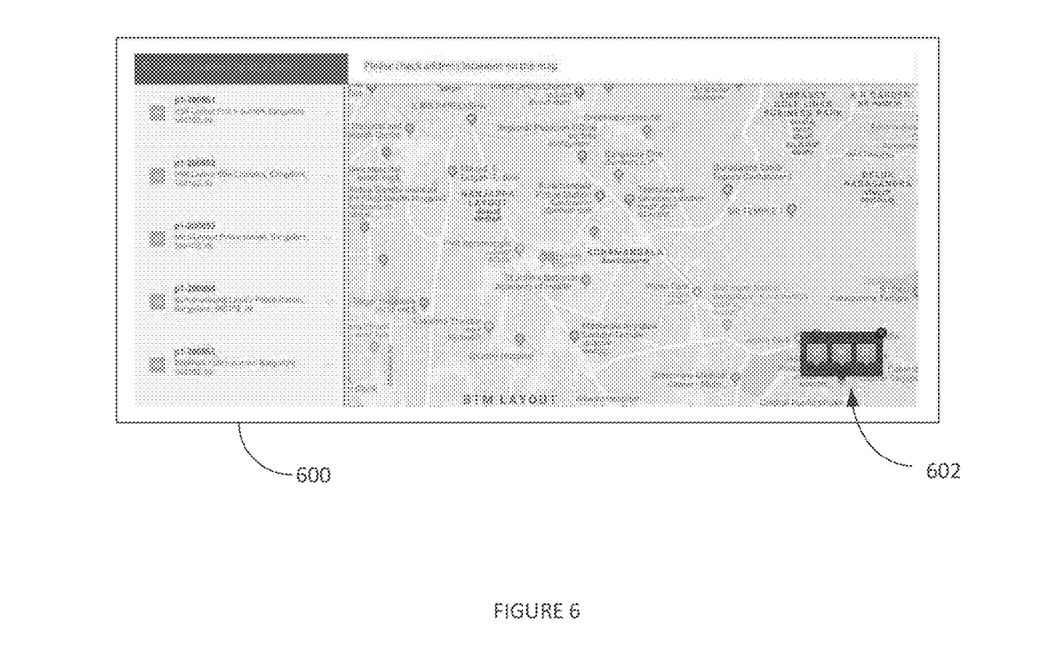
FIG. 6 illustrates another example screen shot of a web map display, according to some embodiments.

FIG. 4 illustrates an example process 400 for correcting a POI geocode with a web mapping application, according to some embodiments. In step 402, all markers are shown at their locations in a virtual map (as provided by web-mapping and geocoding servers 108). In step 404, if multiple markers are on the same latitude/longitude, they are clustered together by showing a different marker (with count mentioned). FIG. 5 and FIG. 6 infra illustrate an example use case of this action.

In step 406, the markers can be moved to a new location. For example, a web mapping application can receive a mouse input or a touch screen input to implement a click/tap and drag of the marker on the web map. It is noted that both clustered and non-clustered markers can be moved to a new location. In step 408, after dragging a marker and placing it at a new location the web mapping display can be updated to show the result of the operation, process 400 can implement process 500.

FIG. 5 illustrates an example process 500 for dragging a marker and placing it at a new location a web mapping display, according to some embodiments. In step 502, the new latitude/longitude is stored for the given address of the POI. In step 504, the former location is shown as a smaller marker (e.g. while the location is selected). In step 506, process 500 displays a dotted line connecting the new location to the former location (e.g. while the location is selected). In step 508, a (dot) indicator is shown on the list/marker. This indicates that the location has been previously updated.

Returning to process 400, in step 410, a location can also be updated by using a text box to search for a location on the left side list.

FIG. 5 illustrates an example screen shot of a web map display, according to some embodiments. As shown, the screen shot shows a web map display 506 with draggable location markers 504 on the right. A scrollable list 502 of location addresses is provided on the left. As shown, draggable location markers 504 and items of scrollable list 502 have confidence-colored, numbered icons. In this example, the confidence value is shown as an integer value.

FIG. 6 illustrates another example screen shot 600 of a web map display, according to some embodiments. As shown, multiple markers 602 can be on the same latitude/longitude. Multiple markers 602 can clustered together by showing a different marker (e.g. with count mentioned).

Figure 7:
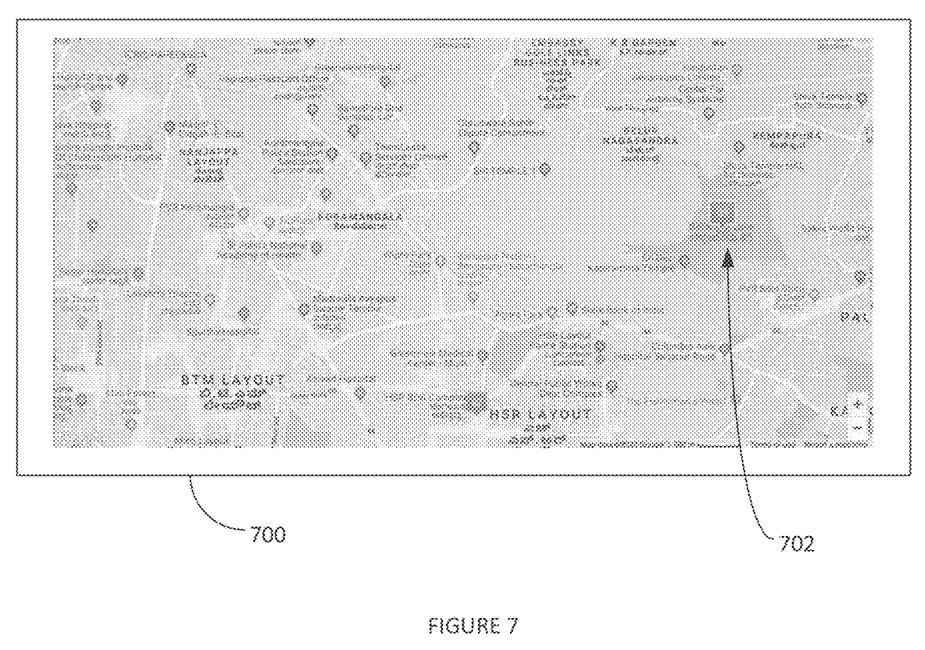
FIG. 7 and FIG. 8 illustrates an example clustering operation and a dragging operation, according to some embodiments.
Figure 8:
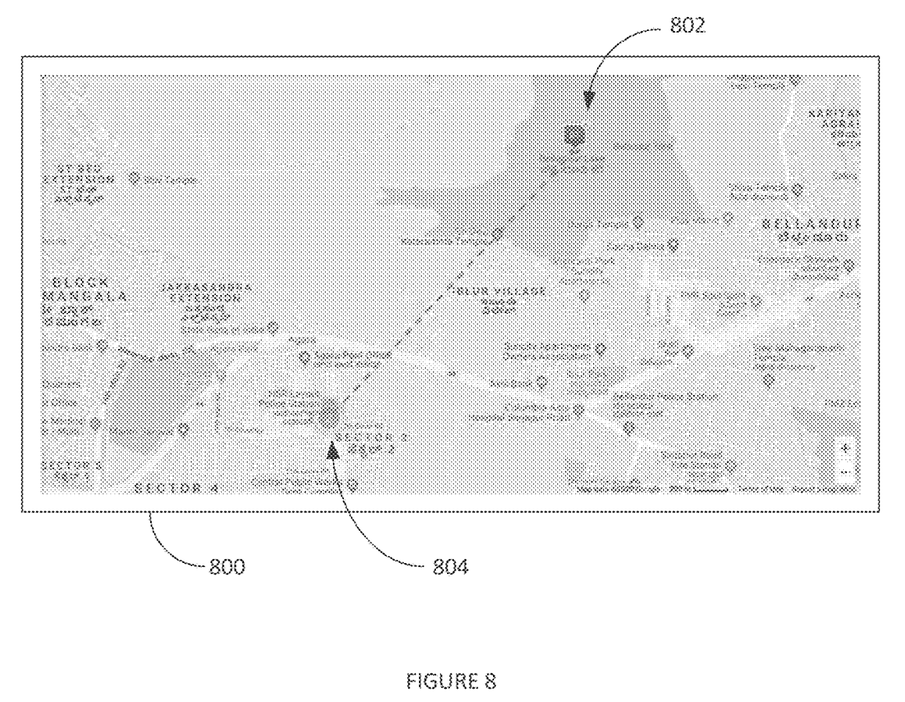

FIG. 7 and FIG. 8 illustrates an example set of screen shots 700 and 800 for implementing a clustering operation and a dragging operation, according to some embodiments. As shown, when dragging operation is performed on a clustered marker 702 out of a cluster, the cluster window auto-closes. This can aid in moving the marker to the desired location. A dotted line 802 is shown connecting the new location to the old location (e.g. while the location is selected). The specific maps and locations of FIGS. 5-8 are provided by way of example and not of limitation.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A computerized method for automatically implementing geocoding corrections in a routing system comprising:
   providing a user-side mobile device, wherein the user-side mobile device comprises a routing application and a display of a web map; and
   geocoding a correction to the latitude and longitude of a point of interest by:
   determining that an end-user of the user-side mobile device has entered an address string into the routing application,
   geocoding the address string to a best possible location,
   generating a confidence score for the geocoded location,
   providing the display of the web map with a set of draggable location markers on the web map adjacent to a confidence-sorted list on a side of the display, and wherein all the draggable location markers are shown at their locations in the virtual map, and
   posting a correctly geocoded location with a routing service using the routing application, and
   wherein a set of multiple markers are on a same latitude-and-longitude, and wherein the set of multiple markers are clustered together by showing a different marker with a count of the set of multiple markers,
   wherein after dragging the marker and placing it at a new location the web mapping display is updated to show the result of the operation, and
   wherein each former location of the marker is displayed as a smaller marker, and
   wherein a dotted line is displayed connecting the new location of the marker to the former location while the location is selected.

2. The computerized method of claim 1 wherein a web mapping application receives a mouse input or a touch screen input to implement a click or tap and drag of the marker on the web map.

* * * * *